United States Patent [19]

Saugier

[11] Patent Number: 5,194,163

[45] Date of Patent: Mar. 16, 1993

[54] PURIFICATION OF WASTE STREAMS

[75] Inventor: R. Kent Saugier, Katy, Tex.

[73] Assignee: FMC Corporation, Philadelphia, Pa.

[21] Appl. No.: 807,326

[22] Filed: Dec. 16, 1991

Related U.S. Application Data

[63] Continuation-in-part of Ser. No. 666,751, Mar. 8, 1991, abandoned.

[51] Int. Cl.$^5$ .............................................. C02F 1/72
[52] U.S. Cl. ................................... 210/759; 210/917; 162/161
[58] Field of Search ............... 210/759, 760, 763, 908, 210/909, 917; 162/161

[56] References Cited

U.S. PATENT DOCUMENTS

| 3,041,139 | 6/1962 | D'Addieco et al. | 23/114 |
|---|---|---|---|
| 3,082,146 | 3/1963 | Wentworth et al. | 167/17 |
| 3,510,424 | 5/1970 | Zumbrunn | 210/759 |
| 3,715,309 | 2/1973 | Zumbrunn | 210/759 |
| 3,737,374 | 6/1973 | Stern et al. | 195/5 |
| 3,945,917 | 3/1976 | Foster | 210/28 |
| 4,049,546 | 9/1977 | Rock | 210/30 R |
| 4,219,418 | 8/1980 | Pilon | 210/50 |
| 4,259,149 | 3/1981 | Jaszka et al. | 162/29 |
| 4,311,598 | 1/1982 | Verachtert | 210/757 |
| 4,370,199 | 1/1983 | Orndorff | 162/161 |
| 4,416,786 | 11/1983 | Knorre et al. | 210/759 |
| 4,443,342 | 4/1984 | Stas et al. | 210/759 |
| 4,478,683 | 10/1984 | Orndorff | 162/162 |
| 4,532,007 | 7/1985 | Noren | 162/161 |
| 4,729,835 | 3/1988 | McNeille et al. | 210/759 |
| 4,756,800 | 7/1988 | Springer et al. | 162/64 |
| 4,781,840 | 11/1988 | Schilling et al. | 210/730 |
| 4,792,407 | 12/1988 | Zeff et al. | 210/748 |
| 4,851,128 | 7/1989 | Rose | 210/669 |
| 4,874,521 | 10/1989 | Newman et al. | 210/639 |
| 4,895,662 | 1/1990 | Stevens | 210/692 |

OTHER PUBLICATIONS

Romano et al., "Selective Oxidation with Ti–Silicalite," *La Chimica & Industria*, 72:610–616 (1990).

*Primary Examiner*—Thomas Wyse
*Attorney, Agent, or Firm*—R. E. Elden; P. C. Baker; R. L. Andersen

[57] ABSTRACT

The present invention is a process for decreasing the concentration of a lignin-containing organic carbon in an aqueous system by incorporating peracetic acid or Caro's acid therein. The process is particularly useful for decolorizing lignin-containing aqueous solutions such as effluents from a pulp mill.

6 Claims, No Drawings

PURIFICATION OF WASTE STREAMS

This is a continuation-in-part of U.S. application Ser. No. 666,751 filed Mar. 8, 1991, now abandoned.

This invention concerns a process to purify aqueous systems containing lignin derivatives, in particular pulp mill effluents.

Industrial waste stream effluents present decontamination or purification problems which are quite different from the problems of municipal sewage treatment. The waste stream from each industrial process type is unique to that process and requires specialized rectification. Common contaminants include excess acidity or basicity (a low or high pH), color, chemical oxidation demand (COD), biological oxidation demand (BOD) and chloride or other ions. Color contamination of surface water presents an especially visible aesthetic problem as well as an adverse effect upon aquatic vegetable and animal life caused by altered light penetration of the surface water. Color also provides a simple indicator of the efficacy of the purification process.

The effluent from pulp mills often has a characteristic black or very dark brown color, even after the waste has experienced the usual waste treatment scheme of primary clarification, aeration, and secondary clarification. The molecules which are primarily responsible for this very intense color are thought to be degraded, oxidized lignins which are separated from the pulp primarily at the first caustic extract stage of the bleach plant. Lignin-containing effluent from chemical pulp mills is a complex mixture containing sugars, aromatics, ethers and other organic compounds including chlorocarbons, some of which are chronic toxins. These molecules pass unchanged through the waste treatment plant because they are refractory towards the biological treatment in the aeration basin.

In the past, the reason to remove color from pulp mill and other waste waters was entirely aesthetic. Recently it has been recognized that part of this color is related to COD and BOD and often includes toxic halogenated organics. The emphasis has therefore switched to oxidizing those molecules which consume oxygen. Nonetheless, the problem remains the same. Much research has been directed toward reducing the "color" of pulp mill effluents. The reason is, in part, because color difference is easy to measure and color reduction is indicative of the decrease of BOD, COD, and other contaminants.

The prior art processes for treating industrial effluents can be separated into four major categories, biological, adsorption/absorption, chemical neutralization and physical treatment. Often two or more types of treatment are required.

Biological treatment has ranged from elaborate activated sludge treatment plants to relatively unsophisticated "wetlands" processing. However, as U.S. Pat. No. 4,851,128 discloses even after standard primary clarification, aeration, and, secondary clarification, pulp mill effluents remain highly colored and are high in absorbable organic halogens (AOX). Further, the sludges from the clarification steps require disposal either by incineration, landfill or other such expensive alternatives.

U.S. Pat. No. 4,851,128 teaches contacting the waters with a cationic flocculant followed by adsorbing the residual color with activated carbon and, after exhaustion, regenerating the carbon by pyrolysis. Other adsorption and absorption processes utilize macroreticular weak anion resin (U.S. Pat. No. 4,049,546); an activated resin (U.S. Pat. No. 4,259,149); a macroporous resin (U.S. Pat. No. 4,895,662); and by absorption into barium sulfate during precipitation (U.S. Pat. No. 3,945,917).

Typical chemical neutralization processes are disclosed in U.S. Pat. No. 4,049,546, such as, the mini-lime process in which 1000 to 2000 mg/l calcium hydroxide is added to pulp mill effluent to precipitate a calcium-organic precipitate, or alternatively, alum is employed to form an aluminum-organic precipitate. The patent discloses that such processes suffer the disadvantage of requiring large quantities of expensive chemicals, and additionally are severely hampered by sludge handling problems. Neutralization processes include precipitation by polyvalent anions and cations, pH adjustment with suitable alkaline or acidic materials such as limestone, lime, sulfuric acid, sulfur dioxide and the like.

Common physical processes include sedimentation, dissolved air flotation, filtering, and sparging with air or an inert gas. U.S. Pat. No. 4,874,521 teaches a process in which caustic effluent (pH 8-10) from an extractor stage is heated under pressure at 150° C. to 200° C., followed by neutralizing to pH 2.6-3.8 to flocculate organic material and subsequently to separate the floc from the residual liquid by dissolved air flotation. Total evaporation of the effluent cannot be employed with waste streams containing halogens because of corrosion of the evaporator. Further, the cost of energy is exorbitant if the effluent solution is dilute.

The present invention overcomes the problems of the prior art by providing a process for decreasing the concentration of organic carbon in an aqueous lignin-containing system comprising the steps of:

a) adjusting the aqueous system to between pH of 2 and 10, and b) incorporating an oxidizing amount of a peracid selected from the group consisting of peracetic acid and monoperoxysulfuric acid; the peracid desirably being incorporated in an amount sufficient to maintain at least 30 (and preferably 100) micromoles of the peracid per liter of aqueous system for about fifteen minutes, thereby decreasing the organic carbon in the aqueous system.

Any aqueous system which contains refractory lignin or lignocellulose moieties may be purified by the process of the present invention as well as solutions containing more easily oxidized organic or inorganic moieties. Suitable lignin or lignocellulose waste streams include those from pulp mills; textile mills and processing operations; waste streams containing agricultural waste materials, such as hulls, bran, chaff, husks, and other extracts and fiber; waste streams from fiber processing operations, such as for hemp, linen, jute, and other natural fibers; and agricultural-related waste streams such as, effluent from animal raising facilities and processing plants, agricultural run off, and the like. Other waste streams include those containing nitrogenous materials, such as ammonia; primary, secondary and tertiary amines; imines; azo compounds and the like, as well as sulfur-containing compounds, such as mercaptans, thioesters; thioesters, and the like. The process is particularly useful for waste streams containing a complex mixture of compounds such as lignins and lignin derivatives which may contain resins, terpenes, and other simple and complex molecules composed of mannan, xylan, phenolics, and the like and their chlorinated and sulfur-containing derivatives.

The present invention is surprising in view of U.S. Pat. No. 3,510,424 which teaches that all compounds having a hydroperoxy group or a peroxygen group are equivalent for the destruction of a cyanide. To the contrary, it has unexpectedly been found that peroxydisulfates intensify the color of lignin-containing solutions while hydrogen peroxide is relatively ineffective, even when catalyzed by metals. For the purpose of this invention, the term "peracid" is intended to include the peracetic acid and monopersulfuric acid and salts thereof (also called monoperoxysulfuric acid, monopersulfuric acid or Caro's acid). Peracids are generally distinguished from hydrogen peroxide in that they are not reduced (to oxygen) on titration with a permanganate or a cerate as is hydrogen peroxide. For example, a solution of a peracid is intended to include the potassium monopersulfate triple salt claimed in U.S. Pat. No. 3,041,139.

The scope of this invention is also intended to include chemical processes in which an active peracid system is formed by hydrolysis or perhydrolysis such as by the hydrolysis of a persulfate.

The rate of decolorizing the solution by the present process initially is very rapid, but continues at a lesser rate for up to 24 hours provided some of peracid remains in the solution, or can be formed in the solution. It is desirable to incorporate sufficient peracid to provide a residue of about 0.1 millimoles per liter in the solution.

Monoperoxysulfuric acid is particularly desirable when the aqueous solution is required to have a low BOD. Monoperoxysulfuric acid also may be desirable to provide sulfate ions either as a plant nutrient or to precipitate calcium, barium or strontium ions, or the like. On the other hand, peracetic acid may be preferred to provide a biodegradable acetate group as a nutrient or to ensure a rapid reaction rate over a wide pH range.

It was unexpected to find that a peracid system would be particularly effective to reduce the color of an effluent from a pulp bleach stage. Alkaline hydrogen peroxide is commonly used in pulp bleach sequences as disclosed in U.S. Pat. No. 4,049,546. Also it is well known peroxides and dipersulfates (also called peroxydisulfate, the persulfates of commerce) may induce crosslinking of lignins according to U.S. Pat. No. 4,781,840. Indeed, it was found that addition of persulfates to the effluent resulted in a dramatic increase in color.

Unexpectedly it was found that the compositions of the present invention are effective in purifying aqueous solutions while neither hydrogen peroxide alone nor a peroxydisulfate is as effective. Hydrogen peroxide was found to reduce the color of pulp mill effluent somewhat, but only at temperatures which result in excessive decomposition, while a persulfate, as noted above, results in an increase of color.

The pH of the aqueous solution can vary over a wide range, of about 2 to 10. The optimum pH will vary according to the source of the aqueous solution but generally the preferred pH will range between 5 and 7.5. Generally, the pH should be about neutral when the aqueous solution is to be discharged into the environment.

Temperature is not a critical factor in the present process. It is well known that the rate of a reaction is a function of temperature. However, with peracids the rate of decomposition competes with the rate of reaction. In the present invention usually about 80% of the color reduction is attained within 5 to 15 minutes with a further color reduction continuing for up to 24 hours, provided that a sufficient amount of a high energy peroxygen composition can be available in the aqueous solution to provide, as a residue, about 30 micromoles per liter of the peroxygen composition or more.

The rate of decomposition of the peroxygen composition increases with an increase in pH. It is desirable for the pH to be maintained between pH 2 and pH 8 when it is permissible to continue the decolorization for an hour or more.

The following examples are intended to illustrate the method of practicing the invention to one skilled in the art and are not intended to limit the scope of the invention.

The invention is exemplified with effluents from pulp mills, either the extractor circuit of a pulp mill or the combined effluent. Some of the effluent samples were dark in color and were diluted to 25% with distilled water (1 volume of effluent plus 3 volumes of distilled water). The transmission of the samples was determined with a Bausch and Lomb spectrophotometer using 465 nm light after the pH was adjusted to 7.6. Alternatively, the absorbance, the negative logarithm of transmission was reported rather than the transmission percent. Color difference is the percent reduction of absorbance.

COMPARATIVE EXAMPLE 1

A $2 \times 2 \times 2$ experiment was designed to determine the effect of varying hydrogen peroxide concentration, pH and temperature on color of pulp mill effluent. In an initial experiment 1 liter of effluent from a pulp mill was adjusted to pH 10.32 and maintained at 40° C. Sufficient hydrogen peroxide was added to provide 0.5 g $H_2O_2$/l (14.7 mmole/l). A sample was periodically withdrawn and diluted with 3 parts of distilled water (diluted to 25%) and the percent transmission (% T) measured at 465 nm. After 30 minutes the % T increased from 12.0% to 19.6%. The results of the $2 \times 2 \times 2$ experiment are presented as Table I.

Another sample, the center point of the designed experiment, containing 1.5 g/l $H_2O_2$ (44 mmole/l) was adjusted to pH 9.3 and maintained at 65-71° C. The % T increased from 10.2% T initially to 23.6% at 30 minutes; 29.6 at 60 minutes and 48.4% T after 20 hours.

From Table I it is clear that the efficacy of hydrogen peroxide in removing color (increasing % transmission) increases with pH and temperature. At best 1.3 g/l (44 millimols/l) $H_2O_2$ removed 33% of the color at pH 10.25 in 30 minutes at 63° C.

COMPARATIVE EXAMPLE 2

A peroxydisulfate (0.25 g $Na_2S_2O_8$) was added to 250 ml of pulp mill effluent with an initial pH of 9.15. The sample was maintained at 71° C. The transmission dropped from 10.2% T to 8.6% T in 10 minutes and grew progressively darker with time.

COMPARATIVE EXAMPLE 3

Ozone and Hydrogen Peroxide

Run A—About 500 mg (26 mmole/l) of ozone was added to 400 ml of extractor effluent at an initial pH of 8.7. The transmission of a solution (diluted to 25%) increased from 14.4% T to 50.4% T (64% color remained) in 15 minutes.

Run B—On repetition with the addition of 0.1% (7 mmole/l) hydrogen peroxide the transmission increased to 67.0% (26% color remained).

The example was repeated with 130 mg (6.7 mmole) ozone (Run C) with and (Run D) without 0.1% (7 mmole) $H_2O_2$. The transmission increased to 42% T without the added $H_2O_2$ and 37.0% T with the added hydrogen peroxide (respectively 55% and 48% color removed).

COMPARATIVE EXAMPLE 4

Ozone+UV+Hydrogen Peroxide

The combined effect of ozone, UV and hydrogen peroxide was compared on samples of extractor stage effluent as follows:

A. Sufficient hydrogen peroxide was added to 800 ml of extractor effluent at pH of 8.7 to provide 0.3% $H_2O_2$. Ozone was sparged through the solution at the rate of 16 mg/min. while the solution was irradiated with 254 nm ultra-violet radiation (UV). The transmission at 25% dilution increased from 21% T to 53% T in 15 minutes. The temperature dropped from 54° C. to 47° C. during this time.

B. The example was repeated increasing the $H_2O_2$ to 1.0%. The transmission increased from 21% T to 59% T in 15 minutes.

C. Example 2B was repeated with 0.3% hydrogen peroxide instead of 1.0% and without added ultraviolet. The transmission increased from 21% T to 75% T in 15 minutes.

COMPARATIVE EXAMPLE 5

Metal-catalyzed $H_2O_2$ (metal peracid)

A. A 500 ml sample of extractor effluent containing 0.93 g/l $H_2O_2$ was adjusted to pH 6 and 3 drops of ammonium molybdate reagent was added as a catalyst. The transmission increased from 22.6% T in the blank to 27.0% T in the sample with molybdate (at 25% dilution) in 15 minutes.

B. Example 4A was repeated at pH 4.3 substituting 500 mg of tungstic acid ($H_2WO_4$) for the ammonium molybdate. The transmission (at 25% dilution) increased from 20.8% T to 26.2% T in 15 minutes and to 59.6% T in 24 hours. The tungstic acid was not completely dissolved in the solution.

C. Example 4B was repeated at pH 8.7 with only 100 mg of tungstic acid (in solution). The transmission (at 25% dilution) increased from 20.8% T to 37.4% T in 15 minutes to 41.6% in 1 hour and to 67% in about 24 hours indicating 74% color removal.

Comparative Examples 3 to 5 illustrate the effect of activating relatively high concentrations of hydrogen peroxide with ozone, ultraviolet radiation and metal catalysts (Mo and W). The data is summarized as Table II with % Transmittance replaced by % of color removed in 15 minutes. The data seems to indicate some activation by ozone and UV in decolorizing lignin-containing effluent, but surprisingly almost no effect by $H_2O_2$ catalyzed with molybdenum or tungsten, which is surprising in view of U.S. Pat. No. 4,729,835 to McNellie et al. which discloses hydrogen peroxide activated with sodium tungstate is particularly effective as an oxidant. Subsequently it was found that the data of Examples 3 and 4 was somewhat misleading because most of the ozone passed through the apparatus unused. Comparative Example 6 presents data based on the ozone consumed.

COMPARATIVE EXAMPLE 6

Ozone/Hydrogen Peroxide/UV

Samples of mixed effluent from a pulp mill were treated with ozone alone (Run A1 and A2), ozone plus hydrogen peroxide (Run B1 and B2), and ozone, plus hydrogen peroxide and UV (Run C). The data reflects the ozone consumed in the experiment rather than the ozone fed as in Comparative Examples 3 and 4. The temperature averaged 62°-70° C. in all cases and drifted down during the runs. The oxidants were added at a uniform rate through each run. The results are reported as % decrease in absorbance (% color decrease). In Runs A1 and A2, the samples consumed 342 (7.1 mmoles) and 242 mg/l (5.0 mmoles) of ozone per liter in 30 minutes. However, the color reduction of both samples was the same (83%).

In Run B1 the color reduction was 78% in 20 minutes after consumption of 186 mg/l (3.9 mmoles) ozone and 64 mg/l (1.9 mmoles) $H_2O_2$, and the color reduction was 88% after 30 minutes after consumption of 262 mg/l (5.4 mmoles) ozone and 150 mg/l (4.4 mmoles) $H_2O_2$.

In Run B2 the color reduction was 81% in 20 minutes after consumption of 113 mg/l (2.4 mmoles) ozone and 65 mg/l (1.9 mmoles) $H_2O_2$ Run C was comparable to Run B2 except the sample was irradiated with 254 nm UV. In 20 minutes the color was reduced 85% after consumption of 118 mg/l (2.4 mmoles) ozone and 48 mg/l (1.9 mmoles) $H_2O_2$; the color was reduced 88% in 30 minutes after consumption of 262 mg/l (5.4 mmoles) ozone and 150 mg/l (4.4 mmoles) $H_2O_2$.

These runs indicate that rate of decrease in color is initially very high with ozone, dropping with time. The results also indicate that the effect of UV radiation is not detectable under the experimental conditions. This is very unexpected in view of the teaching of U.S. Pat. No. 4,792,407 to Zeff et al. The results also indicate that ozone by itself is very effective to decolorize lignin-containing solutions and that the addition of hydrogen peroxide results in added color removal.

EXAMPLE 1

Potassium Peroxymonosulfate (Potassium Caroate)

A 200 ml sample of extractor effluent with a pH of 8.7 and at 54° C. had an initial transmission of 21.4% T (at 25% dilution). After 15 minutes in the presence of 0.8 g of a commercial potassium peroxymonosulfate triple salt (MW=614.7) the transmission increased to 74.2% T indicating 80% color removal.

Unexpectedly a monopersulfate salt (a salt of Caro's acid) was far more effective than any of the activated peroxygens summarized in Table II. Only 6 millimoles per liter removed 80% of the color in 15 minutes!

EXAMPLE 2

An experiment was designed to evaluate the effect of temperature, pH and peracid level to decolorize a different pulp mill extractor effluent. Results appear in Table III. In Run A, a 1 liter sample of effluent containing sufficient added 35% peracetic (PAA) to provide 0.05% (7 mmole/l)PAA in solution was evaluated. The solution was maintained at 66° C. and the color determined as previously at 25% dilution. The run was replicated as Runs B through I while varying temperature, peracetic acid content and pH as reported in Table II.

The results are reported as the percent reduction in color.

The organic peracid was observed to reduce the color almost immediately, but continued to be effective as long as a sufficient residual peracid concentration was maintained. For example, in Run A the peracid concentration after 15 seconds was 0.04% dropping to 0.02% in 1 hour and 0.01% in 24 hours. On the other hand, in Run G, at pH 10, the peracid concentration dropped from 0.03% in 15 seconds to 0.01% in 15 minutes and about 0.004% in 1 hour.

In each of the runs the hydrogen peroxide concentration remained unchanged at about 0.014% indicating decolorization was effected primarily by the peracid.

Table III shows about a 60% reduction of color can be obtained in 15 minutes with 7 mmole/l peracetic acid at about pH 7 or less. On a mol comparative basis this is unexpectedly better than the activated peroxygens in Table II.

EXAMPLE 3

Combined Pulp Mill Effluent

In another series of experiments the combined effluent from a third pulp mill was treated by adding varying amounts of peracetic acid (PAA) but without adjusting the pH, with results described in Table IV. This shows PAA to be effective at a pH as low as 3.5.

TABLE I

COMPARATIVE EXAMPLE 1
% TRANSMISSION OF PULP MILL EFFLUENT

| pH | Temp. °C. | g/l $H_2O_2$ 0.5 | 1.5 |
|---|---|---|---|
| | | % T after 30 mins. | |
| 8.75 | 46 | 15.6 | 19.4 |
| 8.75 | 63 | 17.6 | 22.2 |
| 9.3 | 67-70 | | 23.6 |
| 10.25 | 46 | 23.6 | 31.0 |
| 10.25 | 63 | 19.6 | 25.8 |
| | | % T after 10 mins. | |
| 8.75 | 46 | 12.8 | 15.6 |
| 8.75 | 63 | 14.8 | 19.2 |
| 9.3 | 65-70 | | 17.8 |
| 10.25 | 46 | 16.2 | 20.4 |
| 10.25 | 63 | 19.2 | 24.0 |

TABLE II

COMPARATIVE EFFICACY OF ACTIVATED HYDROGEN PEROXIDE

| Example | mmoles/l $H_2O_2$ | $O_3$ | UV | Metal Catalyst | % of Color Removed in 15 minutes |
|---|---|---|---|---|---|
| 3A | 0 | 26 | — | — | 35 |
| 3B | 7 | 26 | — | — | 74 |
| 3C | 0 | 7 | — | — | 55 |
| 3D | 7 | 7 | — | — | 48 |
| 4A | 21 | 6 | Yes | — | 60 |
| 4B | 70 | 6 | Yes | — | 66 |
| 4C | 21 | 6 | No | — | 82 |
| 5A | 27 | — | — | Mo | 23 |
| 5B | 27 | — | — | 500 mg W | 15 |
| 5C | 27 | — | — | 100 mg W | 38 |

TABLE III

DECOLORIZING EXTRACTOR STAGE EFFLUENT

| Run | pH | Temp. °C. | % PAA | % Color Reduction 30 sec. | 15 min. | 1 hr. | 24 hrs. |
|---|---|---|---|---|---|---|---|
| A | 5 | 66 | 0.05 | ND | 61 | 65 | 71 |
| B | 5 | 46 | 0.05 | 51 | 57 | 58 | 70 |
| C | 5 | 21 | 0.05 | 41 | 44 | 50 | 65 |
| D | 5 | 21 | 0.25 | ND | ND | ND | 85 |
| E | 5 | 21 | 0.10 | ND | ND | ND | 77 |
| F | 5 | 21 | 0.02 | ND | ND | ND | 47 |
| G | 10 | 66 | 0.05 | 50 | 46 | 48 | 52 |
| H | 6.8 | 66 | 0.05 | ND | 60 | 68 | 73 |
| I | 5 | 60 | 0.05 | 58 | 60 | 65 | 73 |

ND = No determination was made
0.05% PAA = 7 mmoles/l

TABLE IV

DECOLORIZING PULP MILL COMBINED EFFLUENT

| Time (min.) | % Color Reduction 0.025% PAA | 0.05 PAA | 0.10% PAA |
|---|---|---|---|
| 0.5 | 43 | 55 | 55 |
| 15 | 61 | 66 | 65 |
| 60 | 61 | 75 | 83 |
| 1440 | 63 | 84 | 88 |
| Initial pH | 4.5 | 4.0 | 3.6 |

0.5% PAA = 7 mmoles/l

I claim:

1. A process for decolorizing an aqueous lignin-containing system comprising the steps of:
   a. adjusting the aqueous system to between pH of 2 and 10, and
   b. incorporating a decolorizing amount of a peroxygen composition selected from the group consisting of peracetic acid, and monoperoxysulfuric acid.

2. The process of claim 1 wherein the peroxygen composition is incorporated in an amount sufficient to maintain a concentration of about 100 micromoles of the composition per liter of aqueous system.

3. The process of claim 1 wherein the peroxygen composition is peracetic acid.

4. The process of claim 2 wherein the peroxygen composition is peracetic acid.

5. The process of claim 1 wherein the peroxygen composition is monoperoxysulfuric acid.

6. The process of claim 2 wherein the peroxygen composition is monoperoxysulfuric acid.

* * * * *